United States Patent
Kamiya et al.

(10) Patent No.: US 9,029,302 B2
(45) Date of Patent: May 12, 2015

(54) SLIDING MEMBER

(75) Inventors: Soji Kamiya, Aichi (JP); Tasuku Sakurai, Saitama (JP)

(73) Assignees: Taiho Kogyo Co., Ltd., Toyota-Shi (JP); Honda Motor Co., Ltd., Tokyo (JP)

(*) Notice: Subject to any disclaimer, the term of this patent is extended or adjusted under 35 U.S.C. 154(b) by 325 days.

(21) Appl. No.: 13/510,175

(22) PCT Filed: Mar. 7, 2011

(86) PCT No.: PCT/JP2011/055274
§ 371 (c)(1),
(2), (4) Date: Jul. 10, 2012

(87) PCT Pub. No.: WO2011/111668
PCT Pub. Date: Sep. 15, 2011

(65) Prior Publication Data
US 2012/0270761 A1    Oct. 25, 2012

(30) Foreign Application Priority Data

Mar. 9, 2010 (JP) ................. 2010-052229

(51) Int. Cl.
*C10M 103/00* (2006.01)
*C10M 103/02* (2006.01)
(Continued)

(52) U.S. Cl.
CPC ........... *C10M 103/00* (2013.01); *C10M 103/02* (2013.01); *C10M 103/06* (2013.01); *C10M 2201/003* (2013.01); *C10M 2201/0413* (2013.01); *C10M 2201/0603* (2013.01); *C10N 2220/082* (2013.01); *C10N 2250/18* (2013.01); *C10M 171/06* (2013.01); *F16C 33/201* (2013.01); *C10M 2201/041* (2013.01);
(Continued)

(58) Field of Classification Search
USPC .................................................. 508/108, 167
See application file for complete search history.

(56) References Cited

U.S. PATENT DOCUMENTS 5,525,246 A    6/1996   Kamiya et al.
6,303,235 B1  10/2001   Kawakami et al.
(Continued)

FOREIGN PATENT DOCUMENTS

EP    1236914 A1    9/2002
EP    2068017 A1    6/2009
(Continued)

OTHER PUBLICATIONS

PCT/ISA/210—International Search Report dated Apr. 5, 2011, issued in PCT/JP2011/055274.
(Continued)

*Primary Examiner* — James Goloboy
(74) *Attorney, Agent, or Firm* — Birch, Stewart, Kolasch & Birch, LLP

(57) ABSTRACT

[Task]
In a sliding member comprising a substrate and a coating layer provided thereon, the coating layer has a sliding surface and is formed of a resin-based coating and particles of a solid lubricant dispersed therein. The orientation ratio of (001) plane of the solid lubricant is enhanced.
[Means for Solution]
The coating layer of a sliding layer has an average thickness of 3 μm or less. The particles of the solid lubricant have 2 μm or more of an average particle diameter as measured by the laser diffraction method. The solid lubricant dispersed has 90% or more of relative C-axis intensity ratio.

7 Claims, 5 Drawing Sheets

(51) Int. Cl.
*C10M 103/06* (2006.01)
*C10M 171/06* (2006.01)
*F16C 33/20* (2006.01)

(52) U.S. Cl.
CPC . *C10M2201/061* (2013.01); *C10M 2217/0403* (2013.01); *C10N 2230/06* (2013.01); *C10N 2240/02* (2013.01); *C10N 2250/141* (2013.01)

(56) References Cited

U.S. PATENT DOCUMENTS

| | | | |
|---|---|---|---|
| 7,833,609 | B2 | 11/2010 | Fujita et al. |
| 2003/0031389 | A1 | 2/2003 | Kanayama et al. |
| 2004/0062860 | A1 | 4/2004 | Nakashima et al. |
| 2005/0157964 | A1 | 7/2005 | Kawagoe et al. |
| 2010/0144564 | A1 * | 6/2010 | Kamiya et al. ............... 508/108 |

FOREIGN PATENT DOCUMENTS

| | | | |
|---|---|---|---|
| JP | 56-142839 | A | 11/1981 |
| JP | 3-20451 | B2 | 3/1991 |
| JP | 4-83914 | A | 3/1992 |
| JP | 6-272715 | A | 9/1994 |
| JP | 11-293368 | A | 10/1999 |
| JP | 3133209 | B2 | 2/2001 |
| JP | 2002-53883 | A | 2/2002 |
| JP | 2002-61652 | A | 2/2002 |
| JP | 2002-339083 | A | 11/2002 |
| JP | 2003-194144 | A | 7/2003 |
| JP | 2003-222136 | A | 8/2003 |
| JP | 2004-263727 | A | 9/2004 |
| JP | 3733539 | B2 | 1/2006 |
| JP | 3733539 | B2 * | 1/2006 |
| JP | 2007-139149 | A | 6/2007 |
| JP | 2007-270205 | A | 10/2007 |
| JP | 2008-95725 | A | 4/2008 |
| JP | 2008095725 | A * | 4/2008 |

OTHER PUBLICATIONS

PCT/IB/308—Second and Supplementary Notice dated Jul. 12, 2012.
International Preliminary Report on Patentability (Forms PCT/IB/373, PCT/IB/326 and PCT/ISA/237) issued on Sep. 11, 2012.

* cited by examiner

Fig.4, 7 Crystal Structure
of Graphite
Lattice Constant a:2.456Å
c:6.696Å
Bonding Distance C-C:1.42Å

Reference Document
[Edited by Yuko Tsuya
Supervised by Masao Matsunaga]
"Solid Lubricant Handbook.
Aoi Shobo"

Relative C axis Intensity Ratio (%)

SLIDING MEMBER

TECHNICAL FIELD

The present invention relates to a sliding member having a coating layer consisting of resin-based coating. More particularly, the present invention enhances the orientation ratio of solid lubricant in the coating layer of the sliding member by means of specifying the thickness of the coating layer, and a method for measuring the particle diameter and average particle diameter of the solid lubricant.

BACKGROUND TECHNIQUE

An old patent document filed by one of the present applicants, i.e., Patent Document 1: Japanese Unexamined Patent Publication (kokai) No. Hei 4-83914, proposes to apply on the surface of an aluminum-based bearing alloy a resin-based and solid-lubricant-containing coating. In that patent document, the following is described: "A solid lubricant or the like is diluted with an appropriate diluting agent. The solid lubricant, diluting agent and polyimide resin are applied on a lining by means of spraying. Drying and baking are carried out at 150 to 300 degrees C. Other methods such as tumbling, immersion and brushing are also possible. The coating thickness is preferably 1 to 25 μm." That document is silent about particle diameter of the solid lubricant.

A typical solid lubricant has a crystal structure in which (001) planes are formed of atoms bonded in a network and are laminated parallel to one another. Parallel cleavage along the crystal planes provides a low friction property. Sliding members, which take an advantage of this property, are largely classified into the following types. In one type, a solid lubricant is directly applied on a substrate. In the other type, a solid lubricant dispersed in a resin binder is applied on the substrate to provide a coating layer. The former type of sliding member is disclosed in Patent Document 2: Japanese Unexamined Patent Publication (kokai) No. 2007-139149 and Patent Document 3: Japanese Unexamined Patent Publication (kokai) No. 2007-270205. The plate-form crystals of a solid lubricant are oriented in said one type of the orientation and the index of (001) plane of these crystals is as high as 90% or more. However, since only the solid lubricant is bonded to a substrate in said one type of sliding member, adhesion is weak and hence serious wear occurs. In addition, when one tries to form a coating layer only by using solid lubricant, it is transferred to the coating layer at low yield. Neither Patent Document 1 nor Patent Document 2 describes, in Detailed Explanation of Invention, the particle diameter of solid lubricant.

Meanwhile, the present applicants disclosed in Patent Document 4, Japanese Unexamined Patent Publication (kokai) No. 2008.95725 that the solid lubricant can exhibit a relative C-axis intensity ratio of 85% or more in the resin-based coating layer of said type. The relative C-axis intensity ratio=a percentage ratio of accumulative intensities of (002), (004) and (008) planes relative to the accumulative intensities of (002), (004), (100), (101), (102), (103), (105), (110) and (008) planes detected by X-ray diffraction. The (002), (004) and (008) planes among the nine planes mentioned are cleavage planes. With regard to the other planes, i.e. (004), (100), (101), (102), (103), (105), (110) and (008) planes, diffraction angle 2θ can be obtained by the same method. Diffraction peaks from the planes other than the nine planes mentioned above may be obtained, but the intensity of the peaks is extremely low. The diffraction peaks of these other planes can therefore be neglected in the calculation of relative C-axis intensity ratio. Even when the orientation attained is "vertical", since X ray necessarily deflects from the six planes other than the cleavage planes, the relative C-axis intensity ratio cannot arrive at 100%. The conditions described hereinbelow must be adjusted to make the orientation close to "vertical". Nevertheless, at present, the highest attainable relative C-axis intensity ratio seems to be slightly higher than 90%.

Patent Document 4 recognizes that it is difficult to attain a relative C-axis intensity ratio of 90% or more. Patent Document 4 also describes a coating method which affects the orientation of a solid lubricant. Solid lubricant particles have such a property that they are liable to cleave in a direction parallel to the surface of the particles. This property is attributable to the crystal structure of solid lubricant. Therefore, the solid lubricant is rendered to have a thin plate form through a crushing process of raw material. Blended solid lubricant in thin-plate form and resin are subjected to spraying, brushing, rolling, dipping (immersion) and the like. The resultant coating is 2 to 10 μm, preferably 2 to 8 μm in thickness. A method for reducing the viscosity of paint is employed. Particle diameter of the solid lubricant is not particularly described. In such a method, main factors that hinder achievement of high orientation are high viscosity of a paint, mutual contact of the solid-lubricant particles and rapid vaporization of solvent. Therefore, it can be said that that patent document admits that, although these factors may be controlled to enhance orientation, a successful resin-based coating cannot be provided.

Patent Document 5, Japanese Unexamined Patent Publication (kokai) No. 2002-339083 is related to blasting material which contains approximately 95% by weight or more of molybdenum disulfide and has an average particle diameter of approximately 1 μm to approximately 20 μm. This material is blasted on, for example, the surface of a piston or the like to impart a low-frictional property. The specification of that patent document describes a measuring method of particle diameter as follows. "A molybdenum disulfide ($MoS_2$) particle is presumed to be spherical and to have the same volume as an actual molybdenum disulfide particle. Therefore, the particle diameter of molybdenum disulfide in the present invention is a converted value calculated on a hypothesis that the particles are spherical. Based on the measured number and volume of particles, calculation can be made that these particles are spherical. Actually, the present inventors used a tester based on the electric resistance method (Colter O Counter, Multisizer type III, produced by Beckman Colter Corporation (aperture-tube 100 μm)) to measure the number and volume of particles and then determined the particle diameter. A desired range of average particle diameter can be provided by setting a desired diameter value of classified particles. A particle blasting treatment uses a molybdenum disulfide blasting material, in which the molybdenum disulfide particles are contained. The average particle diameter is an average value of such molybdenum disulfide particles."

Patent Document 6: European Patent Publication 1236914-A1 (a patent family member of Japanese Unexamined Patent Publication (kokai) No. 2002-61652) discloses preparation of a coating liquid by using molybdenum disulfide, graphite, boron nitride or tungsten disulfide, preferably having an average particle diameter of 15 μm or less, more preferably 0.2 to 10 μm. An appropriate proportion of organic solvent (diluting agent) can be used to prepare a coating liquid, so as to dissolve or disperse these components in the coating liquid. The following descriptions are also provided. "The organic solvent adjusts viscosity to facilitate mixing. Usable organic solvent is not at all limited, provided that the thermosetting resin employed can be dissolved in the organic solvent. For example, when the thermosetting resin is polyamide-imide resin, it is possible to use xylene, N-methyl-2- pyrrolidone, toluene and the like in amounts of 100 to 300 mass parts relative to total 100 parts of these compounds." Further, a method for forming a coating layer is disclosed as follows. "Rinsing with hot water and then drying with hot air are carried out. The above-mentioned coating liquid is diluted with an appropriate diluting agent and is then applied on the lining by spraying. Drying and sintering are carried out at 150-300 degrees C. When the post coating surface is rough, it can be smoothened by means of buffing or the like. A resin coating can be formed by roll transfer, tumbling, immersion, brush application, printing, or the like, other than spraying. A resin coating layer is preferably from 1 to 50 μm in thickness." Patent Document 6 describes a method for measuring the solid lubricant's size but neglects shape of solid lubricant.

A coating layer described in Patent Document 7: United States Patent Publication U.S. 2004/0062660A1 (a patent family member of Japanese Unexamined Patent Publication (kokai) No. 2004-1139734) is formed by air-spraying the base resin and such a solid lubricant as molybdenum disulfide on the inner surface of a bearing. However, the publication does not describe the size of the solid lubricant particles.

PRIOR ART DOCUMENTS

Patent Documents

Patent Document 1: Japanese Unexamined Patent Publication (kokai) No. Hei 4-83914
Patent Document 2: Japanese Unexamined Patent Publication (kokai) No. 2007-139149
Patent Document 3: Japanese Unexamined Patent Publication (kokai) No. 2007-270205
Patent Document 4: Japanese Unexamined Patent Publication (kokai) No. 2008-95725
Patent Document 5: Japanese Unexamined Patent Publication (kokai) No. 2002-339083
Patent Document 6: European Patent Publication 1236914A1
Patent Document 7: United States Patent Publication US 2004/0062860A1

SUMMARY OF INVENTION

Problems to be Solved by Invention

A conventional resin-based coating, in which solid lubricant is oriented, does not have a C-axis intensity ratio exceeding 90%, and therefore, does not exhibit satisfactory property of a solid lubricant. Therefore, it is an object of the present invention to orient the solid lubricant, such that its crystal orientation is as parallel as possible to the sliding direction, thereby enhancing the orientation degree of the solid-lubricant crystals. As a result, the seizure resistance and hence coefficient of friction are lessened and hence seizure resistance is improved.

Means for Solving Problems

The sliding member according to the present invention comprises a substrate and a coating layer provided on the substrate. The coating layer has a sliding surface and consists of a resin-based coating, in which solid lubricant is dispersed. The sliding member is characterized in that its coating layer has an average thickness of 3 μm or less and that the solid lubricant has an average particle diameter, as measured by the laser diffraction method, of 2 μm or more. The solid lubricant dispersed in the entirety of said coating layer has 90% or more of a relative C-axis intensity ratio. The present invention is hereinafter described in detail.

The substrate of the present invention is aluminum-based bearing alloy, copper-based bearing alloy, or resin. Its thickness, composition and the like are known but are described in detail hereinbelow. The solid lubricant used in the present invention is preferably $MoS_2$, $WS_2$, graphite, h-BN and the like.

Crystal structure of the solid lubricant is described more in detail. The solid lubricant used in the present invention has such a layer structure that the atoms are bonded to form a network and the networks are laminated one on another. Referring to FIG. 1, a crystal structure of $MoS_2$ is shown. Slip occurs between the layers of the solid lubricant and imparts to the solid lubricant a very low coefficient of friction.

Effect of Invention

The relative C-axis intensity ratio according to the present invention is the same as that disclosed in Document 4, which is referred to in Paragraph 0004, and is 90% or more, with the maximum being 99%. Theoretically, the relative C-axis intensity ratio does not reach 100% because of the same reasons as described in Patent Document 4. It is believed that the solid lubricant is virtually completely perpendicularly oriented, when the (001) plane orientation index of the solid lubricant is 99%.

DESCRIPTION OF REFERENCE NUMERALS

1 Solid lubricant
2 Substrate

Figure 1:
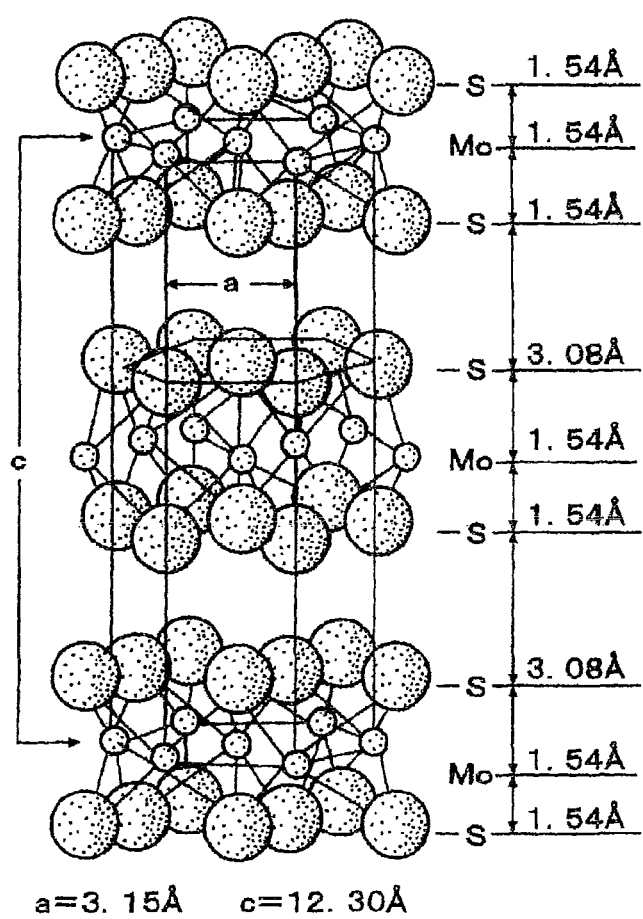
[FIG. 1] shows the crystal structure of $MoS_2$.

BEST MODE FOR CARRYING OUT THE INVENTION $MoS_2$, as shown in FIG. 1, has such a structure that one network of Mo(B) is sandwiched by S(A) at both surfaces thereof. In other words, one network plane of Mo(B) is sandwiched by a pair of network planes of S(A), thereby forming one unit (A-B-A) of $MoS_2$. Here, the a axis extends along a direction connecting the neighboring atoms of network S(A). The c axis extends along a direction connecting the most adjacent atoms between one network S(A) and another network S(A), both of which networks form one unit of $MoS_2$. The crystallographic plane of the c axis is (001) of the A-B-A structure mentioned above. X-ray diffraction detects (001) planes multiplied by an integer multiples of 2, such as (002), (004) and (008). A standard sample of β-$MoS_2$ No. 37-1492 given in JCPDS S card has less slightly less than 45.8% of the above-mentioned (001) plane orientation index.

Figure 2:
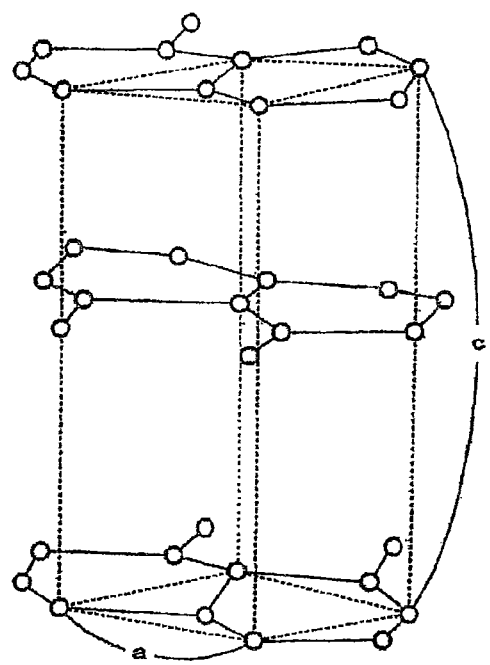
[FIG. 2] shows the crystal structure of graphite.

Meanwhile, graphite shown in FIG. 2 has a=1.42 angstroms and c=3.35 angstroms. The crystal structure of graphite lacks B of the A-B-A structure mentioned above. Similar to $MoS_2$, a standard sample of graphite is given in No. 23-0064. The (001) plane orientation index of graphite is slightly less than 63.3%.

Figure 3:
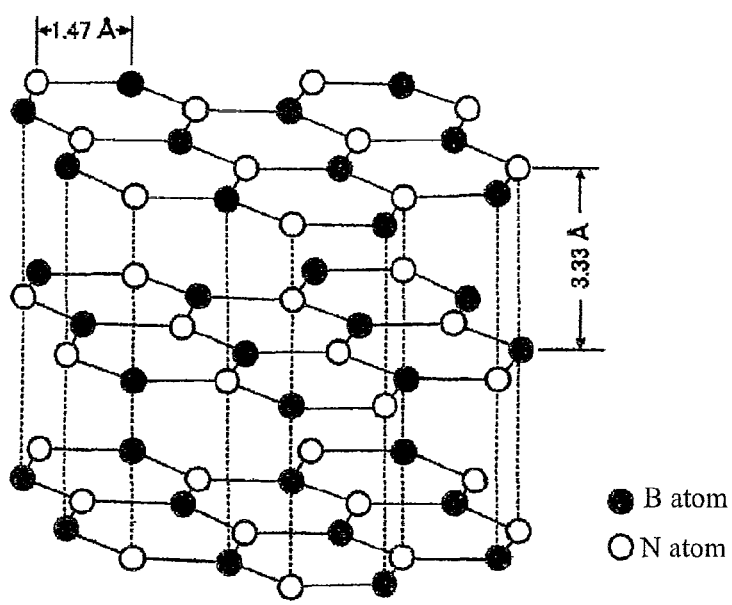
[FIG. 3] shows the crystal structure of h-BN.

In the case of h-BN, three B atoms and three N atoms are mutually arranged to form a hexagonal arrangement as shown in FIG. 3. One side of this hexagon has a length of a=1.47 angstroms. The hexagonal arrangement extends two dimensionally such that each one side mentioned above is common to a neighboring hexagon. This hexagonal arrangement is repeated two dimensionally to form a network. Neighboring network structures repeat in the direction of c axis. The "c" distance is 3.33 angstroms. The standard sample of h-BN No. 34-0421 has a (001) plane orientation index slightly less than 74.3%. As far as the standard samples are concerned, the (001) orientation index of the graphite and h-BN are higher than that of $MoS_2$. Sliding properties of the h-BN or graphite-containing coating layer seem to be improved less remarkably as compared with those of $MoS_2$ through increasing the (001) orientation index.

The sliding surface of a resin-based coating of a sliding member contacts the opposite material. Therefore, the C-axis intensity index of the sliding surface must be as high as 90% or more. The resin-based coating layer may wear away to an extent that the underlying substrate is exposed. Therefore, the entire thickness of a resin-based coating layer must have a relative C-axis intensity ratio of 90% or more. In this regard, the power of the ordinary X-ray diffraction apparatus with the use of $CuK_\alpha$ ray, is at a level of approximately 40kV-100mA. The X ray having the power level mentioned above can penetrate into an aluminum alloy substrate or a copper alloy substrate. Diffraction peaks from such alloy should be omitted in the evaluation of orientation of the solid lubricant. Orientation of solid-lubricant particles, which affects the siding properties, can thus be measured.

Figure 4:
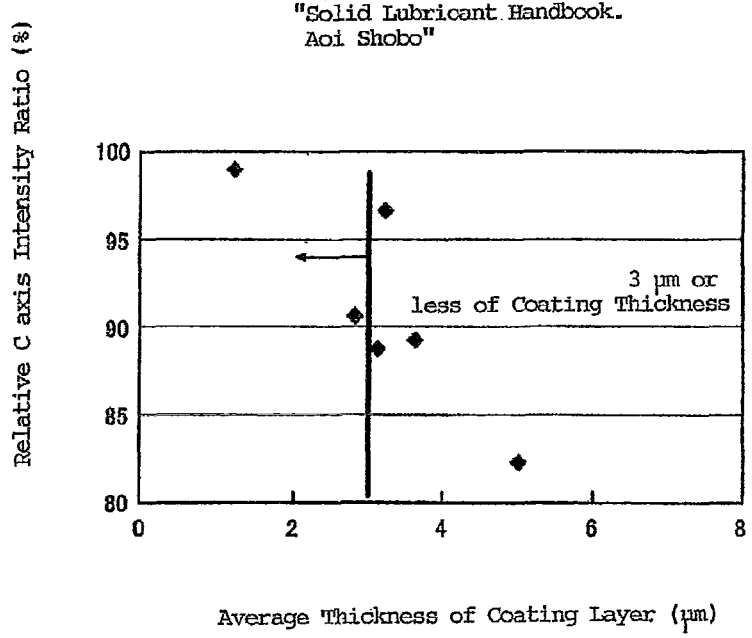
[FIG. 4] is a graph showing the relationship between the average thickness of coating layer and the relative C-axis intensity ratio (%).

In the sliding member according to the present invention, the coating layer must have a thickness of 3 μm or less on average. Referring to FIG. 4, the relationship between the average thickness of a coating layer and the relative C-axis intensity ratio are graphically shown. It is apparent that the C-axis relative intensity ratio is 90% or more, when the average thickness of the coating layer is 3 μm or less. In FIG. 4, the average particle diameter of $MoS_2$, which will be discussed hereinbelow, is 1 to 6 μm.

Figure 5:
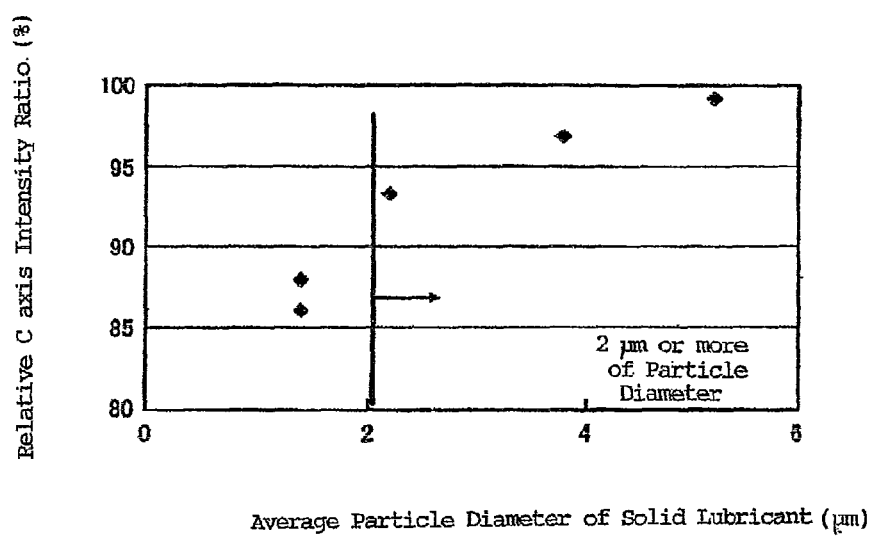
[FIG. 5] is a graph showing the relationship between the average particle diameter of solid lubricant and the relative C-axis intensity ratio (%).

The crystal structure of the solid lubricant determines its particle shape plate-shaped. The plate-form particles of solid lubricant are dispersed in the resin-based coating layer according to the present invention. The average particle diameter of a plate-form solid lubricant may exceed the physical thickness of the resin-based coating layer. The average particle diameter of solid lubricant can be measured by the laser diffraction method or the Fischer method. The present inventors investigated the relationship between these measuring methods of particle diameter and sliding properties. According to the laser diffraction method, a laser beam having a constant wave length is applied to and diffracted from the particles. From the diffraction pattern, particle diameter and its distribution are determined and then the average particle diameter is obtained. The particle diameter obtained by this method is hereinafter simply referred to as "average particle diameter". When the average particle diameter is used as an index of particle size, a clear co-relationship between the average particle diameter and relative C-axis intensity ratio is obtained as graphically shown in FIG. 5. As is apparent from FIG. 5, when the average particle diameter is 2 μm or more, the relative C-axis intensity ratio is 90% or more. Therefore, average particle diameter of solid lubricant must be 2 μm or more. Incidentally, the coating layer is 1 to 6 μm in thickness on average.

Figure 6:
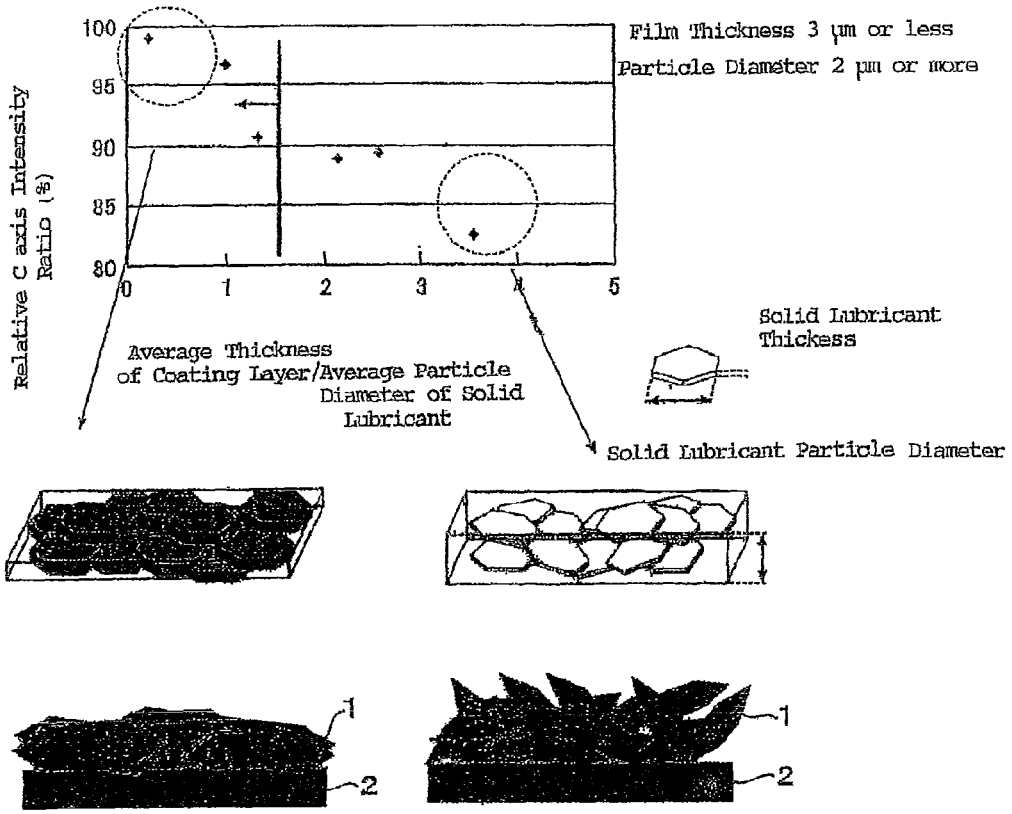
[FIG. 6] is a schematic drawing and a graph showing the effect of the average thickness of a coating layer to the relative C-axis intensity ratio (%).

As is described hereinabove, the particles of solid lubricant are tilted relative to the substrate during formation of coating. When the both parameters, that is, average thickness of coating layer and average particle diameter of solid lubricant, are controlled, degree of freedom of the tilt of the solid-lubricant particles is lowered. High relative C-axis intensity ratio is obtained by means of controlling the freedom, which determines therefore orientation of particles. Referring to the lower four schematic drawings of FIG. 6, the solid lubricant particles have an identical average particle diameter and are dispersed in coating layers having different average thicknesses. The substrate is denoted by 2. FIG. 6 shows the results of comparison tests. It is apparent from the lower half of the four drawings of FIG. 6 that the coating thickness is exactly a factor for tilting the solid lubricant particles 1. In addition, the experimental data are classified and shown in the graph of FIG. 6, the abscissa of which shows ratio, and the ordinate indicates relative C-axis intensity ratio.

Next, in order to form a resin-based coating, the plate-form solid lubricant, in an amount of preferably 10 to 90% by weight, more preferably 30 to 70% by weight, is mixed with a balance of resin. A diluting agent is then added to prepare a paint. Subsequently, the paint is applied on the surface of a bearing alloy by means of any one of pad printing, screen printing, air-spraying, airless spraying, electrostatic coating, tumbling, squeezing rolling, or the like. After application of the coating, drying is carried out. Surface roughness of the coating layer is preferably 5 μm Rz JIS or less.

When compatible action between the coating layer mentioned above and the opposite shaft proceeds, the bearing alloy used for a plain bearing may be exposed and caused to slide on the opposite shaft. The properties required for such alloy are therefore sliding properties. Composition of the bearing alloys is not particularly limited. Preferably, there may be employed an aluminum alloy containing 10% by mass or less of one or more of Cr, Si, Mn, Sb, Sr, Fe, Ni, Mo, Ti, W, Zr, V, Cu, Mg and Zn, and 20% by mass or less of one or more of Sn, Pb, In, Tl and Bi. The elements of the former group mainly impart strength and wear resistance to the aluminum alloy, while the elements of the latter group mainly impart compatibility to the aluminum alloy. Bearing properties differ depending on the species and amount of the respective additive elements. The bearing alloy described above is just an example which can be used as the substrate material of a coating layer according to the present invention. The skirt of a piston is made of high Si—Al alloy, for example, AC8A or AC9B. The coating layer according to the present invention may be applied on the underlying high Si—Al alloys so as to enhance the wear resistance of the piston skirt.

The composition of a copper alloy is not particularly limited. Preferably, a copper alloy contains 25% by mass or less of one or more elements of Pb and Bi, 10% by mass or less of Sn, and 2% by mass or less of one or more of P, Ag, In, Ni, and Al. Of these elements, Pb and Bi are soft metal and impart compatibility to Cu alloy. Sn is a basic component of bronze and imparts strength and wear resistance to Cu alloy. The other elements improve these properties in a supplementary manner as follows. P is effective for deoxidization, promoting sintering, strengthening, and the like. Ag cooperates with S, which is contained in lubricating oil or is an impurity of copper, and forms a compound which is effective for enhancing sliding properties. In improves the corrosion resistance of Cu alloy and also improves lubricating oil wettability on the alloy. Ni and Al are effective for strengthening copper alloy. The bearing alloy typically is approximately 0.3 µm thick. The backing metal for reinforcing the bearing alloy is typically approximately 1.2 mm thick.

Preferably, polyimide resin, polyamide-imide resin, epoxy resin, polyimide bendazole resin are used as a binder resin. Subsequently, the present invention is hereinafter described in detail.

Example 1

Figure 7:
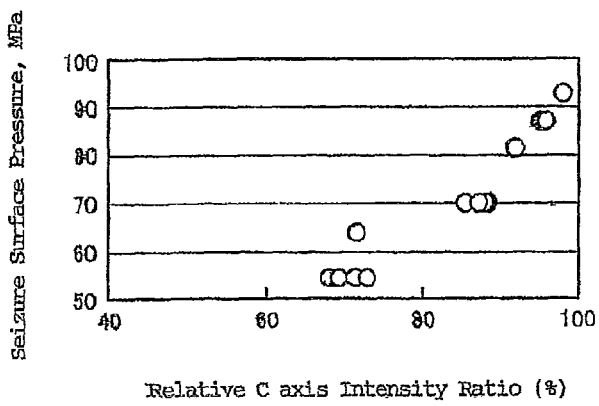
[FIG. 7] is a graph showing the relationship between the relative C-axis intensity ratio (%) and the seizure surface-pressure.

The tested sliding members were prepared by the following method. Aluminum-based bearing alloy (Al-11.5% Sn-1.8% Pb-1.0% Cu-3.0% Si-0.3% Cr, a 1.5-mm thick semi-circular material) was pressure-bonded on the backing metal consisting of steel (SPCC). A coating layer was applied on the aluminum-based bearing alloy by means of air-spraying and was baked at 180 degrees C. for 1 hour. $MoS_2$ having the particle diameters as shown in the following table was used as solid lubricant. The composition prepared consisted essentially of 40% by weight of $MoS_2$ with the balance being a polyimide resin containing an organic diluting agent (NMP). Paint coating was carried out also on the aluminum-based bearing alloy in the form of flat plate and used as a specimen for measuring orientation index of the (001) plane. Average thickness of the post drying coating layer is shown in the following table as "Film Thickness". In addition, seizure resistance was evaluated by the following method, and the results are shown in FIG. 7 and Table 1.

Testing Method for Seizure Resistance
Tester: static load evaluating tester of a bearing
Opposite shaft: forged shaft
Sliding speed (rotational circumferential speed of the opposite shaft): 20 m/s
Lubricating oil: engine oil 0W-20
Lubricating method: forced feeding of oil
Oil temperature: 60 degrees C.
Method for applying load: increased stepwise by 4.3 MPa/3 minutes

TABLE 1

| No. | Particle Diameter of $MoS_2$ (µm) | Film Thickness (µm) | Seizure Surface Pressure (MPa) | Relative C axis Intensity Ratio (%) | Remarks |
| --- | --- | --- | --- | --- | --- |
| 1 | 5.2 | 1 | 92.5 | 98 | Working Example |
| 2 | 5.2 | 1.5 | 86.7 | 95.4 | Working Example |
| 3 | 5.2 | 1.5 | 86.7 | 96 | Working Example |
| 4 | 1.7 | 6 | 69.3 | 85.9 | Comparative Example |
| 5 | 1.7 | 6 | 69.3 | 88.6 | Comparative Example |
| 6 | 1.7 | 6 | 69.3 | 88.3 | Comparative Example |
| 7 | 1.7 | 6 | 69.3 | 87.8 | Comparative Example |
| 8 | 1.7 | 6 | 63.5 | 71.5 | Comparative Example |
| 9 | 1.7 | 7 | 54 | 71.3 | Comparative Example |
| 10 | 1.7 | 7 | 54 | 68.2 | Comparative Example |
| 11 | 1.7 | 7 | 54 | 69 | Comparative Example |
| 12 | 1.7 | 7 | 54 | 72.7 | Comparative Example |

As is clear from FIG. 7 and Table 1, the seizure resistance is significantly improved when the relative C-axis intensity ratio is 90% or more.

INDUSTRIAL APPLICABILITY

As is described hereinabove, the sliding member according to the present invention has improved sliding properties, and therefore, can be used for coating the inner surface of a bearing, coating on the skirt of a piston, and the like.

The invention claimed is:

1. A sliding member comprising a substrate and a coating layer provided thereon, the coating layer having a sliding surface and formed of a resin-based coating and particles of a solid lubricant dispersed therein, characterized in that: said coating layer has an average thickness of 1.5 µm or less; said particles of the solid lubricant have an average particle diameter, as measured by the laser diffraction method, exceeding the thickness of said coating layer; and said solid lubricant dispersed in the entity of said coating layer has a relative C-axis intensity ratio of 90% or more.

2. A sliding member according to claim 1, wherein said solid lubricant is at least one species selected from the group consisting of $MoS_2$, $WS_2$, graphite, and h-BN.

3. A sliding layer member according to claim 1, wherein a the solid lubricant in said coating layer is from 10 to 90% by weight.

4. A sliding member according to claim 2, wherein the solid lubricant in said coating layer is from 10 to 90% by weight.

5. A sliding member according to claim 2, wherein said solid lubricant is a plate-form.

6. A sliding member according to claim 5, wherein the solid lubricant in said coating layer is from 10 to 90% by weight.

7. A sliding member according to claim 1, wherein said solid lubricant dispersed in the entity of said coating layer has a relative C-axis intensity ratio of 95.4% or more.

* * * * *